(12) United States Patent
Fablet

(10) Patent No.: US 7,720,969 B2
(45) Date of Patent: May 18, 2010

(54) DESCRIPTION DOCUMENT FOR A SERVICE OFFERED BY A SERVER IN A COMMUNICATION NETWORK AND METHOD OF VALIDATING A MULTIMEDIA DOCUMENT

(75) Inventor: Youenn Fablet, La Roulais (FR)

(73) Assignee: Canon Kabushiki Kaisha, Tokyo (JP)

( * ) Notice: Subject to any disclaimer, the term of this patent is extended or adjusted under 35 U.S.C. 154(b) by 168 days.

(21) Appl. No.: 10/559,726

(22) PCT Filed: Jul. 21, 2004

(86) PCT No.: PCT/IB2004/002625

§ 371 (c)(1), (2), (4) Date: Dec. 7, 2005

(87) PCT Pub. No.: WO2005/008993

PCT Pub. Date: Jan. 27, 2005

(65) Prior Publication Data

US 2006/0195865 A1 Aug. 31, 2006

(30) Foreign Application Priority Data

Jul. 23, 2003 (FR) ................................. 03 09003

(51) Int. Cl.
*G06F 15/173* (2006.01)
(52) U.S. Cl. .................................................. 709/226
(58) Field of Classification Search .................. 709/218, 709/219, 226, 227, 231, 246; 715/500, 512, 715/716

See application file for complete search history.

(56) References Cited

U.S. PATENT DOCUMENTS

| 7,500,017 | B2* | 3/2009 | Cseri et al. ................... 709/246 |
| 2002/0120652 | A1* | 8/2002 | Rising et al. ................. 707/513 |
| 2002/0184373 | A1* | 12/2002 | Maes ........................... 709/228 |
| 2003/0028559 | A1* | 2/2003 | Moreau .................... 707/501.1 |
| 2003/0031260 | A1* | 2/2003 | Tabatabai et al. ....... 375/240.25 |
| 2003/0033347 | A1* | 2/2003 | Bolle et al. .................. 709/107 |
| 2003/0050942 | A1* | 3/2003 | Ruellan et al. .............. 707/513 |
| 2003/0051216 | A1* | 3/2003 | Hsu et al. .................... 715/530 |
| 2003/0076448 | A1* | 4/2003 | Pan et al. ..................... 348/589 |
| 2003/0126603 | A1* | 7/2003 | Kim et al. ...................... 725/38 |
| 2004/0117798 | A1* | 6/2004 | Newman et al. ............ 719/310 |
| 2004/0205573 | A1* | 10/2004 | Carlson et al. .............. 715/513 |

OTHER PUBLICATIONS

Robert Chinnici et al. Web Services Description Language (WSDL) V1.2. Mar. 2003. W3C. pp. 1-60.*

(Continued)

*Primary Examiner*—John Follansbee
*Assistant Examiner*—Imad Hussain
(74) *Attorney, Agent, or Firm*—Fitzpatrick, Cella, Harper & Scinto

(57) ABSTRACT

A description document for a service offered by a server in a communication network comprises a first abstract part adapted to describe at least one message exchanged on the communication network when a service is implemented and a second concrete part adapted to describe the information relating to the transmission of the messages over the communication network. This service description document comprises, in the first abstract part, a description of abstract constraints associated with a binary multimedia document. It has particular use for validating a multimedia document from the extraction (E11) of the description of abstract constraints and the extraction (E12) of the MPEG7 description of this multimedia document.

26 Claims, 4 Drawing Sheets

OTHER PUBLICATIONS

HP. RDFParser.java. Jan. 2003. Hewlett-Packard. pp. 1-44.*
Jane Hunter et al. A Proposal for an MPEG-7 Description Definition Language (DDL). Feb. 1999. pp. 1-25.*
Jane Hunter et al. An Overview of the MPEG-7 Description Definition Language (DDL) Proposals. 1999-2000. pp. 1-24.*
E. Terzi et al. The MPEG-7 Multimedia Content Description Standard and the XML Schema Language. 2000. Purdue University. pp. 1-8.*
Martinez, Jose et al. MPEG-7 the Generic Multimedia Content Description Standard, Part 1. IEEE Multimedia.2002. pp. 78-87.*
Curbera, F., et al., "*Unraveling the Web Services Web: An Introduction to SOAP, WSDL, and UDDI*," IEEE Internet Computing (Apr. 2002), pp. 86-93, XP-002272683.
Porskamp, P., "*D2.1.2a The PSE System Architecture For The Profiling & Preferences Service*," GigaMobile, 'ONLINE! (Jan. 10, 2001), pp. i-31, XP-002272684, Retrieved from the Internet: URL:https://doc.telin.nl/dscgi/ds.py/Get/File-19821/GM_D212.pdf>.
Christensen, E., et al., "*Web Services Description Languages (WSDL) 1.1*," W3C, 'ONLINE! (Mar. 15, 2001), XP-002203550, Retrieved from the Internet: URL:https://www.w3.org/TR/wsdl>.

* cited by examiner

DESCRIPTION DOCUMENT FOR A SERVICE OFFERED BY A SERVER IN A COMMUNICATION NETWORK AND METHOD OF VALIDATING A MULTIMEDIA DOCUMENT

The present invention concerns a document describing a service offered by a server in a communication network.

It also concerns a method of making a request for a service offered by a server in a communication network.

Finally, it concerns a method of validating a multimedia document inserted in a message intended to be exchanged over the communication network when a service offered by a server in the communication network is implemented.

Within a computer communication network like the Internet, server computers are offering services to other computers, referred to as client computers, more and more.

In practice, the client computer sends a message comprising data to the server computer, which processes these data and returns a result.

Such services are referred to as Web services.

Because of the increase in these services available on a communication network, the protocols for data exchange between computers are frequently standardized.

Thus the SOAP protocol is a protocol for exchanging structured information over the Internet.

According to this SOAP protocol, the information exchanged is structured by means of XML (extended Mark-up Language) tags.

SOAP is a communication protocol which thus makes it possible to access remote services.

This SOAP standard defines the general structure of the messages exchanged as well as the processing which has to be performed by a computer sending or receiving SOAP messages.

A SOAP message is composed of one or more blocks, distributed in two major categories: header blocks, encapsulated in a tag <header>, and body blocks, encapsulated in a tag <body>.

In addition, a SOAP message is transmitted from one computer to another over the communication network by means of a communication protocol such as HTTP (Hyper Text Transfer Protocol), SMTP (Simple Mail Transfer Protocol), the protocol used for the exchange of electronic mail, or the FTP protocol (File Transfer Protocol), the protocol used for the transfer of files.

The layer which makes it possible to interface SOAP with these various communication protocols is referred to as a "binding".

The SOAP application makes it possible to transport binary data, such as images, via a "SOAP+Attachment" extension which can use mechanisms such as MIME or DIME.

There is also known a computer service description language WSDL (Web Service Description Language) which describes Internet services, and in particular services defined by the SOAP standard.

A WSDL document thus contains a list of the services offered by a server computer in a communication network.

This WSDL language is itself an application of the XML mark-up language.

A description of the WSDL 1.1 language will be found on the computer site at the address http://www.w3.org/TR/2001/NOTE-wsdl-20010315.

In practice, an electronic document describing a service in WSDL language comprises two parts.

A first part, referred to as the "abstract part", is adapted to describe the messages exchanged between computers in the communication network when a service is being supplied.

In particular, this first part makes it possible to define the type of data exchanged, and the type of messages used during the execution of the service, as well as the operations implemented, defined by the messages which are exchanged when the service is executed.

An operation can therefore be seen as an elementary service, itself implemented by one or more messages in accordance with a logical sequence of message organization.

The description document of a WSDL service also comprises a second part adapted to define information relating to the transmission of the messages over the communication network.

It indicates in particular how the messages are encoded in order to be transmitted over the network and which communication protocol is actually used.

The current representation of a WSDL document represents in a satisfactory manner the services offered by a server in the communication network handling XML data. This is because, in this case, a description document of a WSDL service enables a server in the communication network to describe abstractly the XML data exchanged by virtue of XML schemas defined in the section "[type/]" of the WSDL description.

According to the WSDL 1.1 standard, a WSDL service description document theoretically makes it possible to describe message exchanges comprising binary data, such as images, by virtue of the MIME extension.

The following example illustrates the syntax used:

```
<wsdl:types>
   ...
</wsdl:types>
<message name="giveImageMsg1">
   <part name="image" type="xsd:binary"/>
   <part name="directory" type="tns:DirectoryType"/>
</message>
<portType name="ImageManipulations">
   <operation name="addImage">
      <input message="giveImageMsg" name="imageInput">
   </operation>
</portType>
<binding>
   <operation name="addImage">
      <soap:operation name="http://example.com/addImage"/>
      <input>
         <mime:multipartRelated>
            <mime:part>
               <soap:body parts="directory" use="litteral"/>
            </mime:part>
            <mime:part>
               <mime:content part="image" type="image/gif"/>
            </mime:part>
         </mime:multipartRelated>
      </input>
   </operation>
</binding>
```

It is thus found that, in the abstract definition part of the message "giveImageMsg1", this message is defined as the combination of two parts: a first "image" part corresponding to an image; and a second "directory" part corresponding to XML data.

A type "xsd:binary" is given to the "image" part. However, this type is related to the serialization used and does not have any true meaning: it is a case in fact of a table of binary values.

In the second part of the WSDL document, this message is serialized at the protocol level in the form of a "multipart" MIME message, the first part of which corresponds to the XML data, and the second part to the image.

This second part takes the form of a MIME attachment of the type "image/gif".

Thus, when a server and a client in the communication network wish to exchange multimedia contents, such as images, apart from any XML data, the WSDL service description document does not make it possible to describe these multimedia contents abstractly.

A WSDL service description document only makes it possible to describe the exchange of multimedia data via the "mime" extension. This extension solely defines the transmission format of the multimedia content, giving the "mime" type of the document such as: image/jpeg, video/mjpeg4 etc.

The purpose of the present invention is to resolve the aforementioned drawbacks and to propose a service description document giving the possibility of making descriptions of a multimedia content, in the same way as XML data.

To this end, the present invention relates, according to a first aspect, to a document describing a service offered by a server in the communication network comprising a first abstract part adapted to describe at least one message exchanged over the communication network when a service is implemented and a second concrete part adapted to describe the information relating to the transmission of the messages over the communication network.

According to the invention, this service description document comprises, in the first abstract part, a description of abstract constraints associated with a binary multimedia document.

Thus the service description document does not directly describe the multimedia content, in the form of a table of binary values, but comprises a description of constraints associated with this document.

This description of abstract constraints makes it possible to define various constraints applicable to a multimedia document, such as for example a maximum image size in terms of number of pixels.

It is thus possible in the abstract part of the document to define a message including a reference to this description of abstract constraints.

Such a message is thus adapted to contain a binary multimedia document, provided that the document meets the abstract constraints described in the service description document.

According to a preferred characteristic of the invention, the description of abstract constraints is represented using the semantics of a language describing a content of a binary multimedia document.

It is in fact advantageous to use semantics already accessible and defined to describe the content of a binary multimedia document.

In a preferred embodiment of the invention, this description of abstract constraints is represented using the semantics defined by the MPEG7 standard.

This is because this MPEG7 standard is a multimedia content description standard, this standard being flexible and capable of extension.

The descriptors and, description schemas according to the MPEG7 standard are adapted to describe multimedia contents. In practice, a descriptor takes a multimedia document as an input and generates an XML document. This XML document respects the syntax defined by the associated MPEG7 description schema and gives the characteristics of the multimedia document vis-à-vis the chosen descriptor.

It is thus possible to use this description of the multimedia document according to the MPEG7 standard to include it in a description document of a service according to the invention, in order to describe abstract constraints associated with the multimedia document.

In practice, the description of abstract constraints is inserted in a sub-part of the first abstract part adapted to describe an abstract structure of the messages exchanged.

This description of abstract constraints can thus be used in the same way as in the case of XML data, defined in a "specimen" sub-part of the first abstract part of the description document of a service.

This first abstract part also comprises a second sub-part adapted to declare at least one elementary message pointing to the description of abstract constraints.

According to a second aspect of the invention, it concerns a method of producing a request for a service offered by a server in a communication network, the service being described in the description document of a service in accordance with the invention.

This method of producing a request comprises the following steps:
  reading the description document of a service;
  selecting a first abstract part adapted to describe at least one message exchanged over the communication network when an operation associated with the service is implemented;
  extracting a description of abstract constraints associated with a binary multimedia document;
  selecting a binary multimedia document according to the description of abstract constraints; and
  producing a request intended for the server in the communication network including the binary multimedia document selected.

By virtue of the description document of a service according to the invention, it is possible to produce a request integrating a binary multimedia document selected according to the description of abstract constraints inserted in the description document of a service.

It is thus possible to produce a request on a communication network allowing the exchange of multimedia data from constraints defined by a server via a description document of a service.

According to a third aspect of the invention, it concerns a method of validating a multimedia document inserted in a message intended to be exchanged over the communication network when a service offered by a server in this network is implemented, the service being associated with a service description document.

According to the invention, this validation method comprises the following steps:
  extracting the multimedia document inserted in the message;
  extracting a description of abstract constraints associated with a binary multimedia document from the description document of a service;
  extracting a content description associated with the multimedia document; and
  comparing the content description and the description of abstract constraints extracted from the service description document.

The description document of a service according to the invention is thus used for validating a message before or after its transfer over the communication network, according to its description.

By virtue of the invention, a message may be validated not only with regard to the content of the XML data, but also with regard to the content of the binary data, associated with a multimedia document.

According to a preferred characteristic of the invention, this validation method is used during a step of selecting a multimedia document to be inserted in a message exchanged at the time of the implementation of a service offered by a communication server.

This validation method can thus be implemented with regard to a client computer, when a request including one or more messages intended for the server is produced. It makes it possible to ensure that the multimedia document addressed to the server can actually be used by this server for implementing the service offered.

At the same time, this validation method according to the invention can also be implemented at the time of the validation of a request received by a server in a communication network for implementing a service described in a service description document.

Thus it is possible, at a server in the communication network, to validate a request including one or more messages having a multimedia content, before the execution of the service and the use in particular of this multimedia content.

The present invention also concerns a device for producing a request for a service proposed by a server of a communication network, the service being described in a service description document according to the invention.

This device for producing a request comprises:
means for reading the description document of a service;
means for selecting a first abstract part adapted to describe at least one message exchanged over the communication network when an operation associated with the service is implemented;
means for extracting a description of abstract constraints associated with a binary multimedia document;
means for selecting a binary multimedia document according to the description of abstract constraints; and
means for producing a request intended for the server in the communication network including the binary multimedia document selected.

It also concerns a device for validating a multimedia document inserted in a message intended to be exchanged over the communication network when a service offered by a server in the communication network is implemented, the service being associated with a service description document.

This validation device comprises:
means for extracting the multimedia document inserted in the message;
means for extracting a description of abstract constraints associated with a binary multimedia document from the description document of a service;
means for extracting a content description associated with the multimedia document; and
means for comparing the content description and the description of abstract constraints extracted from the service description document.

These devices for producing a request and validating a multimedia document have characteristics and advantages similar to those of the methods which they implement.

The present invention also concerns a server computer in a communication network comprising means adapted to implement a validation method according to the invention.

It also concerns a client computer in a communication network comprising means adapted to implement the method of producing a request for a service in accordance with the invention and the validation method according to the invention.

More generally, the present invention concerns a communication network adapted to implement the methods described above according to the various aspects of the invention.

It also concerns an information storage means, possibly totally or partially removable, which can be read by a computer system, comprising instructions for a computer program adapted to implement the methods described above according to the various aspects of the present invention, when this program is loaded in and run by the computer system.

Finally, it concerns a computer program which can be read by a microprocessor, comprising portions of software code adapted to implement the methods described above according to the various aspects of the present invention, when this computer program is loaded in and run by the microprocessor.

Said server computer, client computer, communication network, information storage means and computer program have characteristics and advantages similar to those of the methods which they implement.

Other particularities and advantages of the invention will also emerge from the following description.

In the accompanying drawings given by way of non-limiting example:

Figure 1:
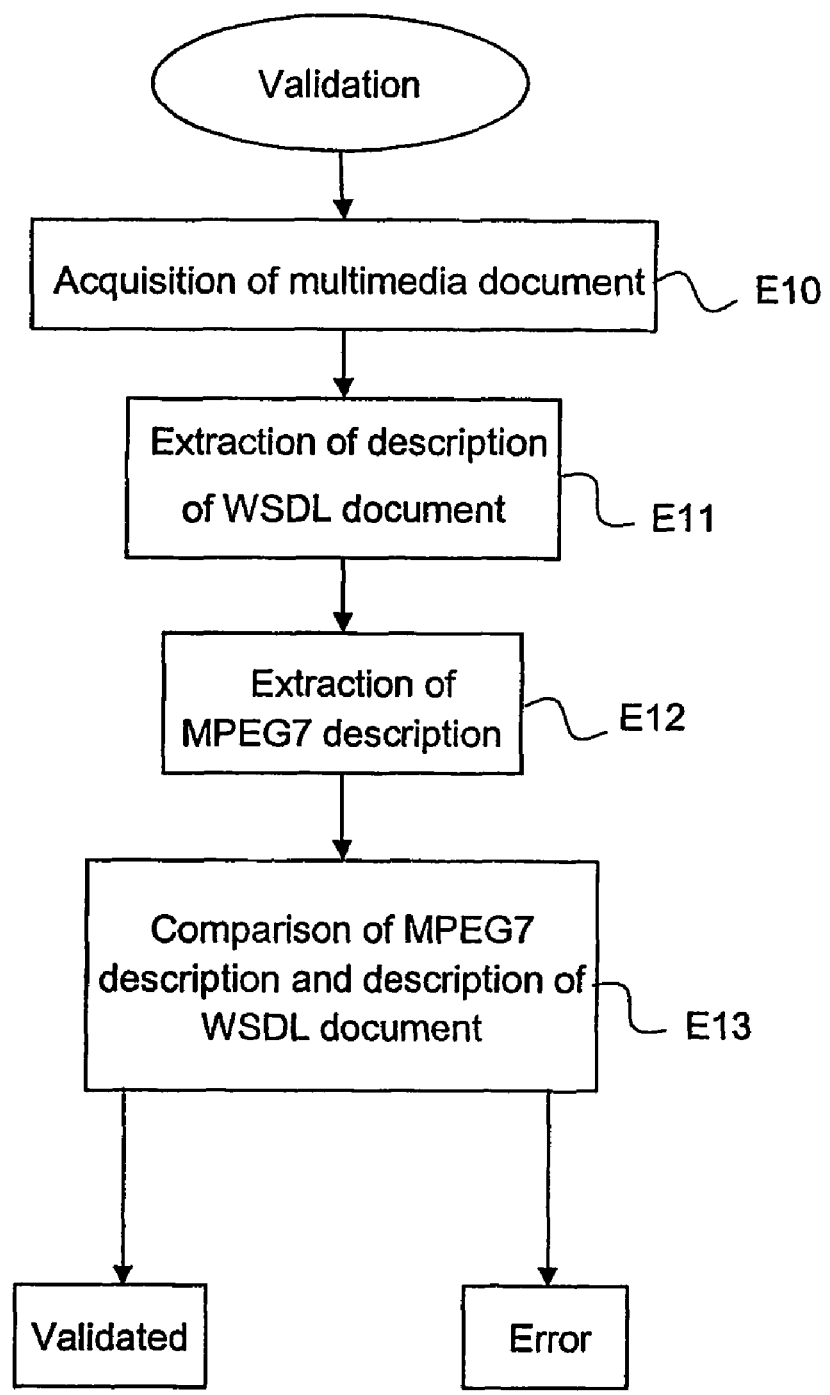
FIG. 1 is an algorithm illustrating the validation method according to one embodiment of the invention.

A description will first of all be given of the structure of a service description document according to a first aspect of the invention.

The case is adopted in which a client computer C and a server computer S in a communication network wish to exchange multimedia contents, in addition to any XML data.

Description documents of a WSDL service are already known giving the possibility of describing types of messages exchanged on the communication network when these messages comprise XML data.

The description document of a service according to the invention offers the possibility of making a specimen description of multimedia documents such as for XML data.

A description document of a WSDL service comprises a first abstract part adapted to describe the messages exchanged on the communication network when the service is implemented and a second concrete part adapted to describe the information relating to the transmission of the messages on the communication network.

In accordance with the invention, the improved service description document comprises in the abstract part a description of abstract constraints associated with a binary multimedia document.

Thus the service description document does not directly comprise the multimedia data, in the form of binary values, but a description of these documents and constraints applied to this document.

It is thus possible to make a specimen description of multimedia documents, in the same way as for XML data.

This specimen description of multimedia documents can comprise the following constraints:

Image whose size is a maximum of 640×480 pixels;
Image solely in grayscale;
Video sequence of the "title" film;
Music composed by "author";
Multimedia document comprising in its header data the name of its creator, etc.

The description of abstract constraints is preferably represented using the semantics of a description language of a content of a binary multimedia document.

It is thus possible to use a known description language, and preferably a description language using a mark-up language of the XML type.

In the remainder of the description, the semantic defined by the MPEG7 standard is considered.

This MPEG7 standard is a flexible and extendable multimedia content description standard. It defines a set of methods and tools for the various phases of the description of multimedia documents.

The MPEG7 standard can be separated into three parts:
the MPEG7 descriptors;
the MPEG7 description schemas; and
a descriptor definition language.

The MPEG7 descriptors and description schemas make it possible to describe multimedia contents.

In practice, a descriptor considers a multimedia document as an input and as an output generates an XML document. This document, in XML mark-up language, complies with the syntax defined by the MPEG7 description schema associated with the document.

It gives the characteristics of the multimedia document vis-à-vis the chosen descriptor.

The descriptor definition language allows integration of new descriptors to MPEG7 by the construction of new description schemas.

An example of an MPEG7 description of an image in grayscale and with a size of 365×452 pixels is given below:

```
<Mpeg7 xmlns="urn:mpeg:mpeg7:schema:2001"
    xmlns:xsi="http://www.w3.org/2001/XMLSchema-instance"
    xmlns:mpeg7="urn:mpeg:mpeg7:schema.2001"
    xsi:schemaLocation="urn:mpeg:mpeg7:schema:2001
Mpeg7-2001.xsd" >
    <Description>
      <MultimediaContent>
        <Image>
          <MediaInformation>
            <MediaProfile>
              <interleave>
                <VisualCoding>
                  <interleave>
                    <Format
                      href=
urn:mpeg:...:VisualCodingFormatCS:2001:1"
                      colorDomain="grayscale"/>
                    <Frame width="356" height="452"/>
                  </interleave>
                </VisualCoding>
              </interleave>
            </MediaProfile>
          </MediaInformation>
        </Image>
      </MultimediaContent>
    </Description>
</Mpeg7>
```

According to the present invention, a description is given in the service description document not directly the multimedia content but the MPEG7 document corresponding to this content.

In practice, this description of abstract constraints is inserted in a sub-part of the first abstract part of the service description document, this sub-part being adapted to describe an abstract structure of the messages exchanged.

This description of abstract constraints is thus placed inside the tag [wsdl:types] of the service description document.

It is thus possible to describe multimedia document types in a similar manner to the XML-Schema language used for XML data.

The advantage of reusing the semantics of the MPEG7 standard lies in the fact that this standard is very complete, well known and well understood on the communication network and supported by many validation tools.

In addition, a description according to the MPEG7 standard can be included directly in a multimedia document. Access to this MPEG7 description is simplified since this multimedia document is possessed.

An MPEG7 document is a document representing an XML mark-up language which can also be described by means of XML schemas.

In order to describe a multimedia content, it is necessary to describe the MPEG7 description type which the multimedia document can take.

In practice, an XML schema is written, the MPEG7 description associated with an image being validated or not with regard to this XML schema.

It should be noted that it is possible to obtain several MPEG7 descriptions for the same multimedia document, since many image characteristic extraction tools exist and an MPEG7 description can include several of these or include various items of information thereon.

The description of abstract constraints inserted in the service description document according to the invention must therefore describe the minimum set of constraints which an MPEG7 description must meet.

In this regard, according to a first embodiment of the invention, the description of abstract constraints is represented in a schema language such as "Schematron". This language is adapted to define a set of minimum constraints.

It is thus possible to define a sufficiently flexible schema to give a set of minimum constraints without obliging the multimedia document to contain only this set.

The "Schematron" language defines a set of laws: a law links one or more XML nodes (specified by XPath), a Boolean test and a result.

Although less well known than the XML-Schema and Relax-NG schema languages, the Schematron language allows direct validation of a multimedia document from the point of view of the abstract constraints thus defined by this language.

An example of a description of a multimedia content by means of this Schematron language within an element "wsdl:type" of a service description document is given below:

```
<wsdl:types>
  <sch:schema
xmlns:sch="http://www.ascc.net/xml/schematron">
    <sch:pattern name="MyImageType">
      <sch:rule context="Mpeg7">
        <sch:assert test="count(Description)> 1"/>
```

-continued

```
        </sch:rule>
        <sch:rule context="Mpeg7/Description">
            <sch:assert test="count(Collection) = 1"/>
        </sch:rule>
        ...
        <sch:rule context="Mpeg7/.../Frame">
            <sch:assert test="@width > 0 and @width < 640"/>
        </sch:rule>
        <sch:rule context="Mpeg7/.../ Format ">
            <sch:assert test="@colorDomain ='grayscale'"/>
        </sch:rule>
        ...
    </sch:pattern>
</sch:schema>
</wsdl:types>
```

According to a second embodiment of the invention, the description, of abstract constraints is represented in the service description document in a schema language such as XML-Schema or Relax-NG, the tags being defined using the semantics of the MPEG7 standard.

The use of these XML-Schema or Relax-NG languages has the advantage of making it possible to easily define the tree of an XML document.

In this tree, the abstract constraints to be defined may concern only an XML sub-tree of the complete XML document.

By way of non-limiting example, it is possible for example to constrain solely the width of an image and not its height.

The MPEG7 standard defines two attributes "width" and "height" for an element "image".

The description document of a service will preferably define only the attribute "width" for the element "image" since the attribute "height" has no constraints.

This description can be presented in the following manner:

```
<wsdl:types>
    <grammar xmlns="http://relaxng.org/ns/structure/1.0">
        <define name="MyFrameType">
            <element name="Frame">
                <attribute name="width">
                    <data type="tns:MySizeType">
                        <param name="maxInclusive">640</param>
                        <param name="minExclusive">0</param>
                    </data>
                </attribute>
            </element>
        </define>
        <define name="MyImageType">
            <element name="Mpeg7">
                ...
                <element name="VisualCoding">
                    <interleave>
                        <element name="Format">
                            <attribute name="colorDomain">
                                <value>grayscale</value>
                            </attribute>
                        </element>
                        <ref name="MyFrameType"/>
                    </interleave>
                </element>
                ...
            </element>
        </define>
    </grammar>
</wsdl:types>
```

The use of such a syntax makes it necessary to define a specific validation tool, when it is sought to validate a multimedia content with regard to the description of a service according to the invention.

In particular, it is necessary to create an extended validation tool for validating a document by a schema if one of these sub-trees is validated in the conventional sense.

This extended validation tool may be implemented in various ways.

A first solution consists of implementing an XSLT transformation which transforms the schema as described above into a schema such as Schematron adapted to define minimum constraints.

This XSLT transformation would add to the initial schema elements for making the schema open and allowing the validation of a multimedia document with regard to the description of abstract constraints.

A second solution is based on the use of a standard XML validation tool as defined below:

```
Do
    RES = Validation(document, schema)
    If (RES does not contain any error) Test = 1
    Otherwise Test = −1
    If (RES contains an error of the type 'element X not defined')
        Remove element X and Test = 0
    If (RES contains an error of the type 'attribute Y not defined')
        Remove attribute Y and Test = 0
As long as (Test = 0)
If (Test = 1) Validation succeeded
Otherwise Validation failed
```

The advantage of using a schema language such as XML-Schema or Relax-NG is using descriptions of multimedia contents and XML data which are relatively similar.

A third solution consists of representing the description of the abstract constraints in a description language for a content of a multimedia document, and preferably according to the MPEG7 standard.

The tags are then adapted to integrate directly or by reference attributes represented in a schema mark-up language such as XML-Schema.

Use is then made directly of the elements and attributes defined by the MPEG7 standard within the service description document.

If necessary, the XML-Schema language is used either via an attribute of the type "mpeg:type" or directly integrated in the MPEG7 elements.

The following example illustrates the use of the MPEG7 semantics in this third solution:

```
<xs:complexType name="myFrameType">
    <xs:element name="Frame">
        <xs:complexType>
            <xs:attribute name="width">
                <xs:simpleType>
                    <xsd:restriction base="xsd:integer">
                        <xsd:maxInclusive value="640"/>
                        <xsd:minExclusive value="0"/>
                    </xsd:restriction>
                </xs:simpleType>
            </xs:attribute>
        </xs:complexType>
    </xs:element>
</xs:complexType>
<Mpeg7 mpeg:name="MyImageType">
    <Description>...
```

-continued

```
<VisualCoding>
    <interleave>
        <xs:choice>
            <Format colorDomain="grayScale"/>
            <Frame mpeg:type="tns:myFrameType"/>
        </xs:choice>
    </interleave>
</VisualCoding>
... </Description>
</Mpeg7>
```

The advantage of this third solution is to present a syntax which is close to MPEG7 and very readable.

It is then necessary to use a specific validation tool, as before. It is also possible to use an XSLT transformation document in order to transform the XML syntax into a schema language such as Schematron allowing the direct use of standard validation tools, as before.

Once this description repeating the MPEG7 standards is inserted in the "type" section of the service description document, a reference to this description is inserted in the first abstract part of the service description document.

Conventionally, this first abstract part comprises a second "message" sub-part adapted to declare the elementary messages exchanged during the implementation of the message.

In this second sub-part, there exists at least one elementary message pointing towards the description of abstract constraints.

This elementary message is preferably associated with an attribute adapted to specify whether the message comprises a binary multimedia content type.

An example is given below of a service description document according to the invention:

```
<wsdl:types>
    <grammar xmlns="http://relaxng.org/ns/structure/1.0">
        <define name="MyImageType">
        ...</define>
    </grammar>
</wsdl:types>
<message name="giveImageMsg1">
    <part name="image" type="tns:MyImageType" mpeg:multimedia="true"/>
    <part name="directory" type="tns:DirectoryType"/>
</message>
<portType name="ImageManipulations">
    <operation name="addImage">
        <input message="tnsgiveImageMsg/" name="imageInput">
        </operation>
</portType>
<binding>
    <operation name="addImage">
        <soap:operation name="http://example.com/addImage"/>
        <input>
            <mime:multipartRelated>
                <mime:part>
                    <soap:body parts="directory" use="litteral"/>
                </mime:part>
                <mime:part>
                    <mime:content part="image" type="image/jpeg"/>
                </mime:part>
            </mime:multipartRelated>
        </input>
    </operation>
</binding>
```

In this example, two types of data are defined "MyImageType" and "DirectoryType". These two types are referenced in the structure of the message of the operation "addImage".

This message thus consists of two abstract parts. The first part defines XML data and points to the schema "DirectoryType". This is the conventional mechanism defined by the WSDL standard.

The second part defines a multimedia content and points to the schema "MyImageType". The distinction in content type, between XML data or multimedia content, can be made in two ways:

either the schema pointed to makes explicit the fact that it describes solely multimedia contents. Consequently the part which points to this schema corresponds to a multimedia content.

or the service description document clearly makes explicit the fact that this part of the message is a multimedia content, for example via an attribute "mpeg:multimedia="true"", or an attribute of the mine type specifying that it is a case of a multimedia document.

This message description thus forms part of a description of an exchange of messages between a client computer C and a server computer S.

The second concrete part of the service description document, delimited by a "binding" tag, comprises serialization information.

It is then possible to use conventional mechanisms such as DIME or MIME.

This second concrete part adds the information necessary for sending the message over the network.

In the previous example, the extension MIME of the WSDL standard is used. The image which will pass over the network is therefore defined in an abstract manner by the schema "MyImageType" and serialized in the form of a MIME attachment.

Such a service description document thus makes it possible to describe a multimedia content in an abstract manner, in a similar manner to what is known for XML data.

It is then possible to use similar mechanisms of validation of a multimedia document, production and execution of a service request on a communication network.

A description will be given below with reference to FIG. 1 of a method of validating a multimedia document intended to be exchanged over the communication network when a service is used, when the service is associated with a service description document according to the invention.

An acquisition step E10 is first of all implemented in order to acquire a multimedia document.

When a message is produced, for example by a client computer C, this acquisition step E10 can consist of selecting a multimedia document to be inserted in a message which will be exchanged when the service offered by the communication server is implemented.

This acquisition can be made using an image database for example.

At the time of validation of a message received, for example by a server computer S, this acquisition step E10 consists of extracting the multimedia document from a message exchanged over the communication network.

An extraction step E11 is then adapted to extract the description of abstract constraints inserted in the service description document and connected to the multimedia document acquired at the previous step.

A second extraction step E12 is also adapted to extract the MPEG7 description associated with the multimedia document acquired.

It is necessary for the computer implementing this validation method to possess the various MPEG7 extractors adapted to consider a multimedia content as an input and to give as an output an MPEG7 description.

These extractors can be dedicated to a specific description of a multimedia document (extraction of the dominant color of an image for example). It may also be a question of a program which will extract an MPEG7 (binary) description already contained in the multimedia document.

A comparison step E13 next makes it possible to compare this MPEG7 description with the description extracted from the description document of a service according to the invention.

It should be noted that the MPEG7 standard is an extendable standard, and it is not possible to generate a document comprising all the possible MPEG7 descriptions of the multimedia document.

Several solutions are then possible for implementing this validation method.

First of all, it is possible that the computer implementing this validation method supports only a subset of the MPEG7 standard and is thus adapted to generate all the MPEG7 information in this subset in a document in XML mark-up language.

Although simple, this method does not profit from the extensibility of the MPEG7 standard.

It is also possible to extract from the description inserted in the service document all the characteristics of the multimedia content.

At the extraction step E12 of the MPEG7 description, an MPEG7 document is then generated possessing all the characteristics identified from the description of the WSDL document.

This method requires the creation of a tool for reading an MPEG7 description and generating a specific MPEG7 document.

A third solution is based on an iterative method using the known XML-Schema or Relax-NG validation tool. In practice, a first MPEG7 document is extracted at the extraction step E12.

The comparison step E13 is adapted to validate this MPEG7 document from the description of the WSDL document.

If an error of the type "element X missing" appears, it is necessary to add the characteristic X to the MPEG7 document.

The extraction step E12 is then reiterated in order to extract the characteristic X from the multimedia document and complete the MPEG7 description.

The comparison E13 and extraction E12 steps are reiterated as long as an error exists.

```
Do
    RES = Validation(document, schema)
    If (RES does not contain any error)
        Test = 1
    Otherwise
        Test = -1
    If (RES contains an error of the type 'element X awaited')
        CAR = CharacteristicOf (X)
        AddCharacteristic (CAR, document, X)
        Test = 0
As long as (Test = 0)
If (Test = 1)
    Validation successful
Otherwise
    Validation failed
```

It should be noted that many multimedia documents possess a binary compressed MPEG7 description incorporated directly in this document. This MPEG7 description can be used as a base document for the validation method, in particular the iterative validation method described above.

This method of validating a multimedia content can be applied in particular during the construction of the message.

Figure 2:
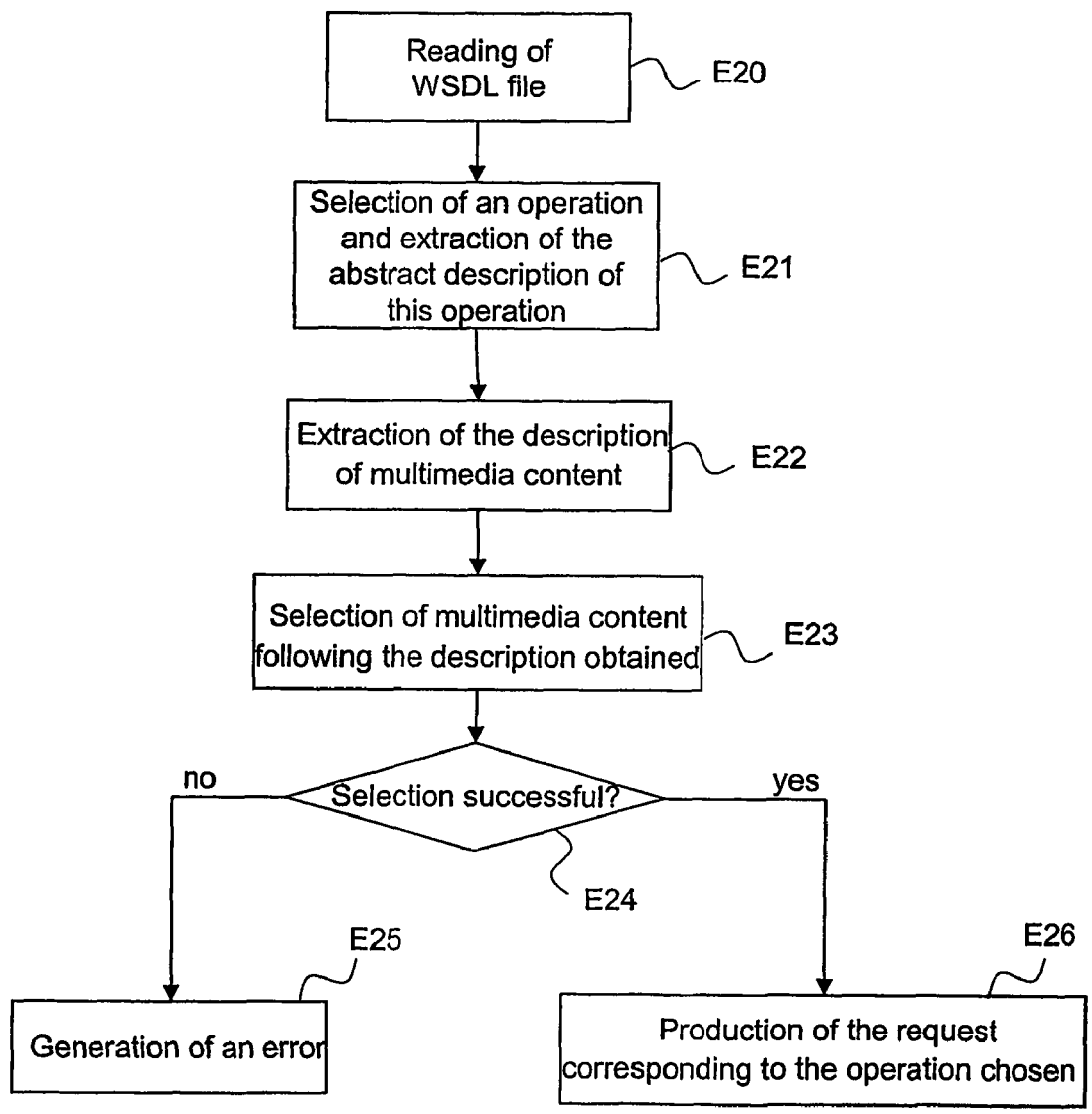
FIG. 2 is an algorithm illustrating the method of producing a request for a service according to one embodiment of the invention.

Thus with reference to FIG. 2 a description will be given of a method of producing a request for a service offered by a server in a communication network, this service being described in a WSDL service description document according to the invention.

A reading step E20 is first of all implemented in order to read the description document of a WSDL service.

An extraction step E21 is adapted to extract a first abstract part of the WSDL document adapted to describe a message exchanged over the communication network when an operation associated with the service is implemented.

In practice, an operation is selected and the abstract description associated with this operation is extracted.

An extraction step E22 is adapted to extract the description of abstract constraints associated with a binary multimedia document which is to be inserted in the message intended for the server.

A selection step E23 is then adapted to select a multimedia content according to the description obtained at the extraction step E22.

In practice, a multimedia step is selected according to the abstract constraints described in the WSDL service description document.

At the time of this selection of a multimedia content, the validation method described previously with reference to FIG. 1 can be implemented.

A test step E24 checks whether this selection has succeeded, that is to say whether the multimedia document selected has been validated using the description of a multimedia content.

If not, a step E25 of generating an error intended for the client is implemented.

Otherwise a step E26 of producing a request corresponding to the chosen operation, intended for the server in the communication network, is implemented.

This request includes the binary multimedia document selected at the selection step E23.

This request is next sent to a server for execution when the service offered by this server is implemented.

Thus, when a message is constructed, the validation process makes it possible to ensure that the image is valid, when an image is selected from amongst several multimedia contents, or when a multimedia content is produced.

Figure 3:
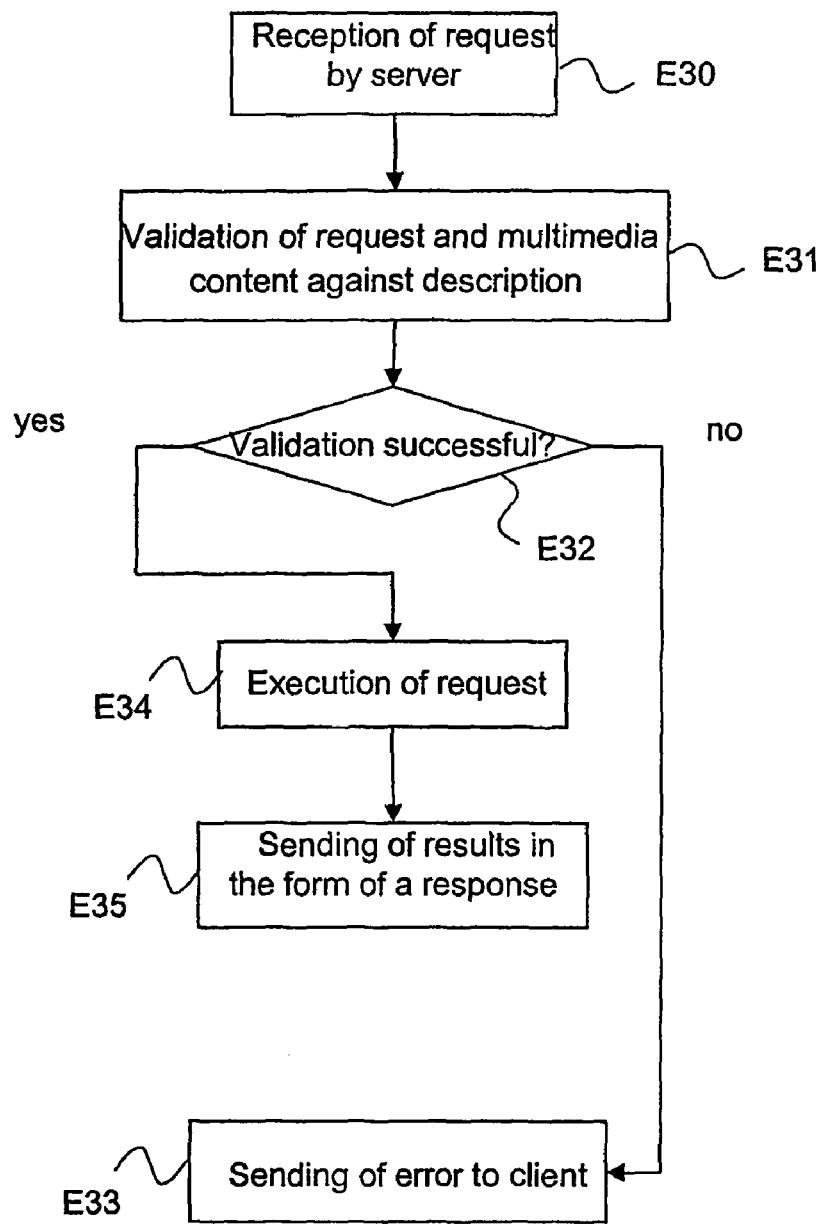
FIG. 3 is an algorithm illustrating the execution of a request for a service received by a server in a communication network.

A description will now be given with reference to FIG. 3 of the validation of a request received by the server in a communication network.

When the message is received, it is a question for the server or for an intermediate node between the client and the server on the communication network to ensure that the client has sent a multimedia document as specified in the service description document according to the invention.

This method of validating a request comprises first of all a step E30 of reception of the request by a server, or by an intermediate node in the network.

A validation step E31 is implemented using the content of the request.

This validation step E31 is identical to the validation method described above with reference to FIG. 1, in which the acquisition step E10 consists here of extracting a multimedia document inserted in the request.

A test step E32 checks whether the validation has succeeded.

If the validation has not succeeded, a step E33 of sending an error message is implemented, destined for the client.

If the validation has succeeded, a step E34 of executing this step is implemented in a conventional manner on the server.

A step E35 of sending the results in the form of a response to the client computer is then implemented.

The present invention thus makes it possible to describe in an abstract manner multimedia contents in the context of Web services. It is thus possible to constrain multimedia data which will be exchanged during the implementation of a service, in a similar manner to that used for exchanging XML data.

Figure 4:
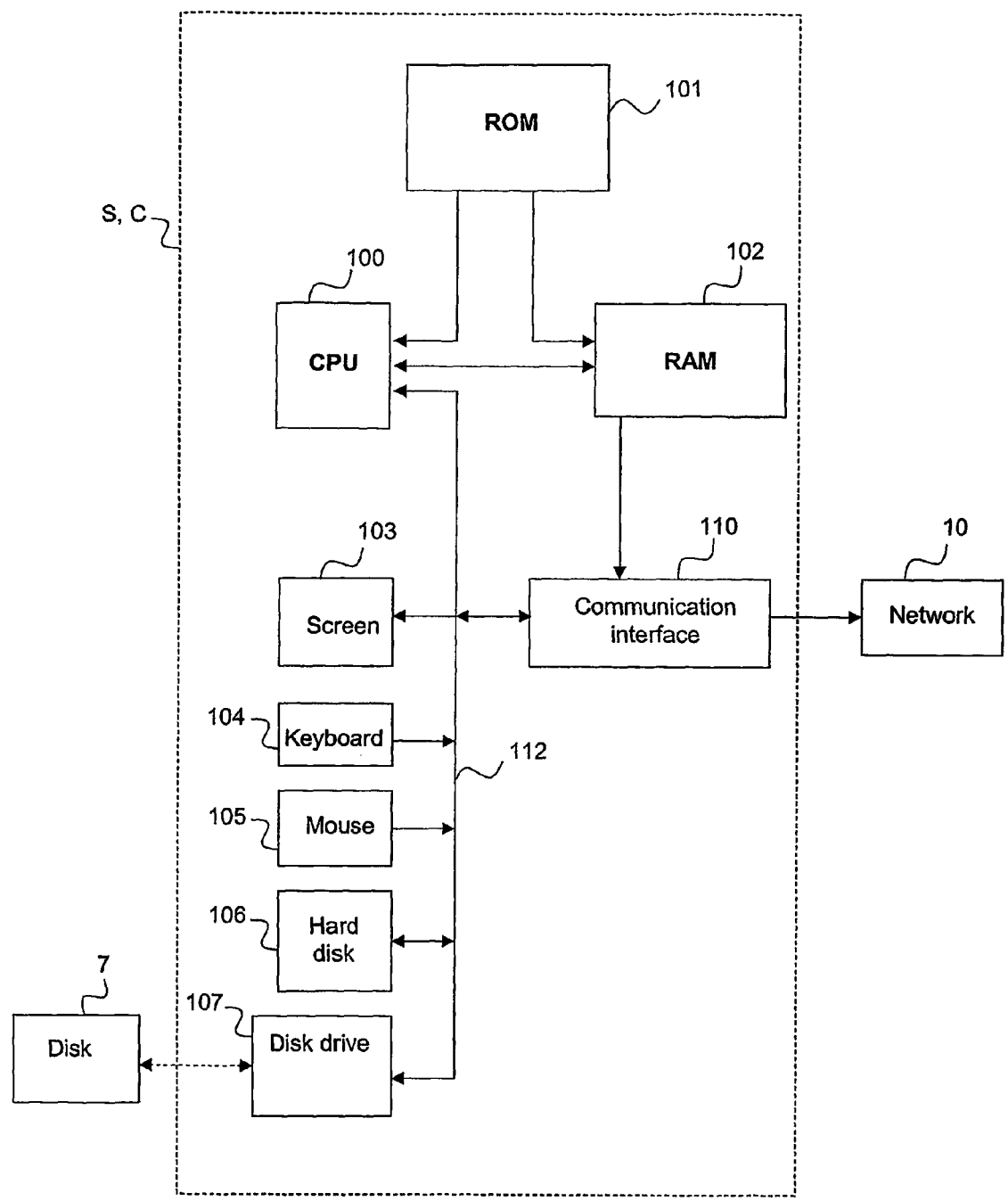
FIG. 4 is a block diagram illustrating a computer adapted to implement the invention.

In order to implement the methods of validating, producing a request for a service and executing a request for a service, devices associated with these methods can be incorporated in a computer as illustrated in FIG. 4.

In particular, the device for producing a request can be incorporated in a client computer C in a communication network whilst the device for executing a request can be incorporated in a server computer S in a communication network.

Naturally the devices intended to implement the various methods of the present invention can be implemented in the same computer or in different stations in the communication network.

In particular, the device for validating a multimedia document will preferably be incorporated both in a client computer C and in a server computer S in the communication network.

More precisely, the various means adapted to implement the steps of the methods according to the invention can be incorporated in a microprocessor 100 and a computer-readable storage medium. For example, a read only memory 101 ("Read-only memory" or ROM) may be adapted to store a program for validating a multimedia document, producing a service request, or executing such a request.

A random access memory 102 ("Random access memory" or RAM) is adapted to store in registers the values modified during the running of the program for validating a multimedia document, producing a service request or executing such a request.

The microprocessor 100 is integrated in a computer which can be connected to various peripherals and to other computers in a communication network 100. In particular, this computer corresponds to a server computer S, a client computer C or an intermediate computer at a node in this communication network 10.

This computer S, C comprises in a known manner a communication interface 110 connected to the communication network in order to receive or transmit messages.

The computer also comprises document storage means, such as a hard disk 106, or is adapted to cooperate by means of a disk drive 107 (floppy disks, compact disks or computer cards) with removal document storage means, such as disks 7. These fixed or removable storage means can comprise the code of the methods according to the invention.

They are also adapted to store an electronic document describing a service as defined by the present invention.

By way of variant, these programs can be stored in the read only memory 101.

In a second variant, these programs can be received in order to be stored as described previously by means of the communication network 10.

The computer S, C also possesses a screen 103 for serving for example as an interface with an operator by means of the keyboard 104 or the mouse 105 or any other means.

The central unit 100 (CPU) will then execute the programs relating to the implementation of the invention. On powering up, the programs and methods relating to the invention stored in a non-volatile memory, for example the memory 101, are transferred into the memory 102, which will then contain the executable code of the invention as well as the variables necessary for implementing the invention.

The communication bus 112 affords communication between the various sub-elements of the computer or connected to it.

The representation of this bus 112 is not limiting and in particular the microprocessor 100 is able to communicate instructions to any sub-element directly or by means of another sub-element.

Naturally many modifications can be made to the example embodiments described above without departing from the scope of the invention.

The invention claimed is:

1. A computer-readable storage medium storing control logic for causing a computer to implement a method of offering a service, described in a service description document, in a communication network, wherein the method includes:

extracting, from the service description document, an abstract part;

extracting, from the service description document, a concrete part;

extracting, from a binary multimedia document, a content description of the binary multimedia document;

comparing the content description and the description of the abstract constraints extracted from the service description document; and transmitting an error message, if the content description does not satisfy the abstract constraints, wherein the abstract part is adapted to describe at least one message exchanged over the communication network when the service is performed, wherein the abstract part includes a description of abstract constraints associated with the binary multimedia document, wherein the concrete part is adapted to describe information relating to transmission of the messages over the communication network, and wherein characteristics of the extracted content description are determined by the abstract constraints extracted from the service description document, wherein the description of abstract constraints is represented in a schema language and defines a set of minimum constraints that the binary multimedia document must meet to be processed when the service is performed.

2. A computer-readable storage medium according to claim 1, wherein the description of the abstract constraints is represented using semantics of a description language of a content of the binary multimedia document.

3. A computer-readable storage medium according to one of claim 1 and 2, wherein the description of abstract constraints is represented using semantics defined by a Moving Picture Experts Group 7 (MPEG7) standard.

4. A computer-readable storage medium according to one of claim 1 and 2, wherein the description of abstract constraints is represented in Extensible Mark-up Language (XML).

5. A computer-readable medium according to one of claim 1 and 2, wherein the description of abstract constraints is represented in a schema language and includes tags defined using semantics of a Moving Picture Experts Group 7 (MPEG7) standard.

6. The method according to claim 5, wherein the abstract constraints are represented in an XML-Schema language or in a Relax-NG language.

7. A computer-readable storage medium according to one of claim 1 and 2, wherein the description of abstract constraints is represented in a description language of a content of the binary multimedia document, such that tags are adapted to integrate directly or by reference attributes represented in a schema mark-up language.

8. The method according to claim 7, wherein the attributes are represented in an XML-Schema language.

9. A computer-readable storage medium in accordance with claim 7, wherein the description language of the content of the binary multimedia document is defined according to a Moving Picture Experts Group 7 (MPEG7) standard.

10. A computer-readable storage medium according to one of claim 1 and 2, wherein the description of abstract constraints is represented in a schema language adapted to define a set of minimum constraints.

11. The method according to claim 10, wherein the description of the abstract constraints is represented in a Schematron language.

12. A computer-readable storage medium according to one of claim 1 and 2, wherein the description of abstract constraints is inserted in a sub-part of the abstract part and is adapted to describe an abstract structure of messages exchanged.

13. A computer-readable storage medium according to claim 12, wherein the abstract part includes a sub-part adapted to declare at least one elementary message pointing to the description of the abstract constraints.

14. A computer-readable storage medium according to claim 13, wherein the at least one elementary message is associated with an attribute adapted to specify that the at least one elementary message is of a binary multimedia content type.

15. A method of producing a request for a service offered by a server, which includes a processor, in a communication network, wherein the service is described in a service description document, the method comprising:
    reading, by the processor, the service description document;
    selecting, by the processor, an abstract part of the service description document;
    extracting, by the processor, a description of abstract constraints;
    selecting, by the processor, a binary multimedia document according to the description of the abstract constraints;
    producing, by the processor, a request for the server in the communication network;
    extracting, by the processor, from the binary multimedia document, a content description of the binary multimedia document;
    comparing, by the processor, the content description and the description of the abstract constraints extracted from the service description document;
    if at least one characteristic specified by the description of abstract constraints is determined to be missing from the extracted content description, extracting, by the processor, the at least one missing characteristic from the binary multimedia document and adding the at least one missing characteristic to the content description;
    comparing again, by the processor, the content description and the description of the abstract constraints extracted from the service description document; and
    transmitting, by the processor, the request to the server, if the content description satisfies the abstract constraints,
    wherein the abstract part is adapted to describe at least one message exchanged over the communication network when an operation associated with the service is performed,
    wherein the description of the abstract constraints is associated with the binary multimedia document,
    wherein the request includes the binary multimedia document selected,
    wherein characteristics of the extracted content description correspond to the abstract constraints extracted from the service description document.

16. A computer-readable storage medium storing control logic for causing a computer to perform a method of producing a request according to claim 15.

17. A method of validating a binary multimedia document when a service offered by a server, which includes a processor, in a communication network is performed, wherein the service is associated with a service description document, the method comprising:
    acquiring, by the processor, the binary multimedia document;
    extracting, by the processor, a description of abstract constraints associated with the binary multimedia document from the service description document;
    extracting, by the processor, from the binary multimedia document, a content description of the binary multimedia document;
    comparing, by the processor, the content description and the description of the abstract constraints extracted from the service description document;
    if at least one characteristic specified by the description of abstract constraints is determined to be missing from the extracted content description, extracting, by the processor, the at least one missing characteristic from the binary multimedia document and adding the at least one missing characteristic to the content description;
    comparing again, by the processor, the content description and the description of the abstract constraints extracted from the service description document; and
    implementing, by the processor, the service on the binary multimedia document, if the content description satisfies the abstract constraints,
    wherein characteristics of the extracted content description correspond to the abstract constraints extracted from the service description document.

18. The method according to claim 17, further comprising:
    extracting a Moving Picture Experts Group 7 (MPEG7) description associated with the binary multimedia document;
    comparing said MPEG7 description and the description of the abstract constraints;
    reiterating the extracting of the MPEG7 description, if a characteristic of the MPEG7 description is missing;
    extracting the characteristic from the binary multimedia document; and
    adding the characteristic to the MPEG7 description.

19. The method according to claim 17, wherein the description of the abstract constraints is represented in a language describing a content of the binary multimedia document.

20. A computer-readable storage medium storing control logic for causing a computer to perform a method of validating a binary multimedia document in accordance with one of claim 17 and 19.

21. The method according to one of claim 17 and 19, wherein a language describing a content of the binary multimedia document is defined under a Moving Picture Experts Group 7 (MPEG-7) standard.

22. The method according to one of claim 17 and 19, wherein, in the extracting of the content description, a Moving Picture Experts Group 7 (MPEG-7) description of the binary multimedia document inserted in the binary multimedia document is extracted.

23. The method according to one of claim 17 and 19, wherein the method is performed during selection of the binary multimedia document to be inserted in a message exchanged during implementation of the service offered by the server in the communication network.

24. The method according to one of claim 17 and 19, wherein the method is performed during validation of a request received by the server in the communication network for implementing the service associated with the service description document.

25. A device for producing a request for a service offered by a server in a communication network, wherein the service is described in a service description document, the device comprising:

a microprocessor;

a read only memory adapted to store a program for producing the request for the service;

a random access memory including registers adapted to store variables modified during execution of the program;

means for reading the service description document;

means for selecting an abstract part of the service description document, wherein the abstract part is adapted to describe at least one message exchanged over the communication network when an operation associated with the service is performed;

means for extracting a description of abstract constraints associated with a binary multimedia document from the service description document;

means for selecting the binary multimedia document according to the description of the abstract constraints;

means for extracting, from the binary multimedia document, a content description of the binary multimedia document, wherein characteristics of the extracted content description correspond to the abstract constraints extracted from the service description document;

means for comparing the content description and the description of the abstract constraints extracted from the service description document;

means for extracting the at least one missing characteristic from the binary multimedia document and adding the at least one missing characteristic to the content description, if at least one characteristic specified by the description of abstract constraints is determined to be missing from the extracted content description;

means for comparing again the content description and the description of the abstract constraints extracted from the service description document; and means for producing a request for the service offered by the server in the communication network, if the content description satisfies the abstract constraints, wherein the request includes the binary multimedia document selected.

26. A device for validating a binary multimedia document during implementation of a service offered by a server in a communication network, wherein the service is associated with a service description document, the device comprising:

a microprocessor;

a read only memory adapted to store a program for validating the binary multimedia document;

a random access memory including registers adapted to store variables modified during execution of the program;

means for acquiring the binary multimedia document;

means for extracting a description of abstract constraints associated with the binary multimedia document from the service description document;

means for extracting, from the binary multimedia document, a content description of the binary multimedia document;

means for comparing the content description and the description of the abstract constraints extracted from the service description document;

means for extracting the at least one missing characteristic from the binary multimedia document and adding the at least one missing characteristic to the content description, if at least one characteristic specified by the description of abstract constraints is determined to be missing from the extracted content description; and means for comparing again the content description and the description of the abstract constraints extracted from the service description document, wherein characteristics of the extracted content description correspond to the abstract constraints extracted from the service description document.

* * * * *